(12) United States Patent
Aupperle et al.

(10) Patent No.: US 6,992,574 B2
(45) Date of Patent: Jan. 31, 2006

(54) OBJECT MATCHING VIA RFID

(75) Inventors: Bryan Eric Aupperle, Cary, NC (US); James M. Mathewson, II, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 10/612,251

(22) Filed: Jul. 2, 2003

(65) Prior Publication Data

US 2005/0001719 A1 Jan. 6, 2005

(51) Int. Cl.
*G08B 26/00* (2006.01)

(52) U.S. Cl. ............... 340/505; 340/571; 340/572.1

(58) Field of Classification Search ........... 340/505, 340/539.13, 539.32, 571, 572.1, 10
See application file for complete search history.

(56) References Cited

U.S. PATENT DOCUMENTS

| | | | | |
|---|---|---|---|---|
| 5,809,481 | A * | 9/1998 | Baron et al. ............... 705/14 |
| 6,027,027 | A * | 2/2000 | Smithgall ............... 235/488 |
| 6,218,943 | B1 * | 4/2001 | Ellenbogen ............... 340/572.4 |
| 6,331,817 | B1 * | 12/2001 | Goldberg ............... 340/573.1 |
| 6,473,704 | B1 * | 10/2002 | Ito et al. ............... 702/94 |
| 6,496,806 | B1 * | 12/2002 | Horwitz et al. ............... 705/28 |
| 6,624,752 | B2 * | 9/2003 | Klitsgaard et al. ........ 340/572.1 |
| 6,693,539 | B2 * | 2/2004 | Bowers et al. ........... 340/572.1 |
| 6,774,811 | B2 * | 8/2004 | Kaufman et al. ...... 340/825.49 |
| 6,834,800 | B2 * | 12/2004 | Okamura ............... 235/385 |
| 2002/0123843 | A1 | 9/2002 | Hood |

FOREIGN PATENT DOCUMENTS

| | | |
|---|---|---|
| WO | WO 99/59112 | 11/1999 |
| WO | WO 02/27623 A1 | 4/2002 |
| WO | WO 02/031629 A3 | 4/2002 |

* cited by examiner

*Primary Examiner*—Daryl C Pope
(74) *Attorney, Agent, or Firm*—Jerry W. Herndon, Esq.; Steven M. Greenberg, Esq.; Christopher & Weisberg, P.A.

(57) ABSTRACT

An object matching method, system and apparatus. The system can include a multiplicity of RFID tags storing corresponding tag data coupled individually to respective objects. Selected ones of the RFID tags can be programmed with tag data associating the selected ones of the RFID tags with one another. At least one RFID reader/interrogator can be configured to interrogate the RFID tags and responsive to the interrogation to read the corresponding tag data. Finally, matching logic can be programmed to determine whether interrogated ones of the RFID tags contain tag data indicating an association between coupled ones of the objects. Notably, the matching logic can be disposed in the RFID reader/interrogator.

7 Claims, 2 Drawing Sheets

OBJECT MATCHING VIA RFID

BACKGROUND OF THE INVENTION

1. Statement of the Technical Field

The present invention relates to the radio frequency identification (RFID) and more particularly to RFID object tracking.

2. Description of the Related Art

Conventional object tracking can range from ordinary inventory tracking to admissions ticket processing. For instance, in the context of inventory, object tracking can entail cataloging types, variations and quantities of physical items so as to know how much of any one physical item is present in inventory at any given time. Similarly, in the context of admissions ticket processing, object tracking can entail cataloging categories of admissions criteria and the like. Where object levels, such as inventory items or distributed tickets remain generally low and lack substantial variety and diversity from item to item, a conventional object tracking system can include a mere pencil and paper tracking method. In contrast, where object levels are significant and diverse in nature, technologically advanced methods can be employed. Once such technologically advance method can include bar code labeling and tracking systems.

The prototypical bar code based inventory tracking system includes a selection of bar codes which are affixed to the physical items to be tracked. In the case of a two-dimensional bar code, a sufficient amount of item information can be encoded into the bar code and read by a bar code reader through optical means such as a laser. In the case of a three-dimensional bar code, a vast amount of item information can be encoded in the bar code. In both cases, individual items in inventory can be tracked on an individual basis through the individual scanning of each respective bar code label.

While bar code based object tracking systems have proven to be highly effective in regard to efficiency and cost when compared to conventional pencil and paper tracking systems, bar code based inventory tracking systems remain deficient in their own regard. More specifically, to track a collection of items always will require the individual handling of each item during which time the bar code of the individually handled item can be scanned with the bar code reader. For small collections, the individual handling of an item can be of little consequence. For high volume applications, however, bar code scanning lacks a required level of efficiency and speed.

In respect to high volume applications, RFID techniques have been employed in lieu of bar code techniques principally because RFID techniques do not require the individual handling of an item during the object tracking process. Typical high volume applications include the processing of vehicles through a toll booth, security access cards and inventory control systems. Because the individual handling of an item is not required in an RFID based system, the tracking of objects in an RFID object tracking system further can be performed without the knowledge or explicit consent of the object, or the person in control of the object.

RFID is an area of automatic identification that has quietly been gaining momentum in recent years and is now being seen as a radical means of enhancing data handling processes, complimentary in many ways to other data capture technologies such bar coding. The object of any RFID system is to carry data in suitable transponders, generally known as tags, and to retrieve data, by machine-readable means, at a suitable time and place to satisfy particular application needs. Data within a tag may provide identification for an item in manufacture, goods in transit, a location, the identity of a vehicle, an animal or individual. By including additional data the prospect is provided for supporting applications through item specific information or instructions immediately available on reading the tag.

An RFID object tracking system requires, in addition to tags, a means of reading or interrogating the tags and some means of communicating the data to a host computer or information management system. In this respect, an RFID object tracking system also can include a facility for programming data into the tags. Notably, the tags can be active and powered in nature, or passive and unpowered in nature. Communication of data between tags and a reader can be by wireless communication. Two methods distinguish and categorize RFID object tracking systems, one based upon close proximity electromagnetic or inductive coupling and one based upon propagating electromagnetic waves. Coupling is via 'antenna' structures forming an integral feature in both tags and readers. While the term antenna is generally considered more appropriate for propagating systems it is also loosely applied to inductive systems.

RFID systems can be roughly grouped into four categories: electronic article surveillance (EAS) systems, portable data capture systems, networked systems and positioning systems. EAS systems typically involve a one bit system used to sense the presence or absence of an item. Portable data capture systems, by comparison, can be characterized by the use of portable data terminals with integral RFID readers and can be used in applications where a high degree of variability in sourcing required data from tagged items may be exhibited. Networked systems applications can generally be characterized by fixed position readers deployed within a given site and connected directly to a networked information management system. The transponders are positioned on moving or moveable items, or people, depending upon application. Finally, positioning systems use transponders to facilitate automated location and navigation support for guided vehicles.

Potential applications for RFID may be identified in virtually every sector of industry, commerce and services where data is to be collected. The attributes of RFID are complimentary to other data capture technologies and thus able to satisfy particular application requirements that cannot be adequately accommodate by alternative technologies. Principal areas of application for RFID that can be currently identified include: transportation and logistics, manufacturing and processing, and security. A range of miscellaneous applications further can be distinguished, including animal tagging, waste management, time and attendance, postal tracking, airline baggage reconciliation, and road toll management.

Despite many of the apparent advantages of RFID technology, deficiencies remain for some potential applications. Specifically, while RFID technology can be effective for garden variety inventory tracking, or for high speed vehicle logging, RFID technology heretofore has not been applied to the problem of object matching. More particularly, the problem of object matching entails the matching of two specific objects, for instance an object and a receipt, or two different objects such as disk reader and computer. In conventional RFID technology, merely a single tag can be used to track an object. Yet, at least two objects must be tracked in a matching relationship in the course of object matching.

SUMMARY OF THE INVENTION

The present invention is an RFID based technology for matching objects in an object matching system. An object matching system can include any system in which two objects are to be matched to one another, for instance a baggage claim system wherein a bag can be matched to a baggage claim tag, or an admissions ticket system wherein an admissions ticket can be matched to a particular gate, seat or section and the like. In a preferred aspect of the invention, an object matching system can include a multiplicity of RFID tags storing corresponding tag data coupled individually to respective objects. Selected ones of the RFID tags can be programmed with tag data associating the selected ones of the RFID tags with one another. At least one RFID reader/interrogator can be configured to interrogate the RFID tags and responsive to the interrogation to read the corresponding tag data. Finally, matching logic can be programmed to determine whether interrogated ones of the RFID tags contain tag data indicating an association between coupled ones of the objects. Notably, the matching logic can be disposed in the RFID reader/interrogator.

A method of matching objects can include interrogating at least two RFID tags coupled to respective objects. Responsive to the interrogation, tag data can be read from each of the RFID tags. Subsequently, it can be determined whether the tag data matches. In this regard, the determining step can include determining whether at least a portion of the tag data matches. In any case, at least two RFID tags can be programmed with a baggage claim check number. Consequently, for each baggage claim check number, one of the programmed RFID tags can be coupled to a bag and another of the programmed RFID tags can be coupled to a claim check.

In addition, at least two RFID tags can be programmed with a customer identifier. Concurrently, one of the programmed RFID tags can be coupled to a consumer card held by a customer, while the remaining ones of the programmed RFID tags can be coupled to products which have been purchased by the customer. Similarly, at least two RFID tags can be programmed with a ticket number. Concurrently, one of the programmed RFID tags can be coupled to a seat associated with a ticket having the ticket number, and another of the programmed RFID tags can be coupled to the ticket. It will be recognized by the skilled artisan, though, that numerous other applications can be described in which objects can be matched via the RFID matching technology of the present invention and the scope of the present invention is not meant to be limited by the selection of examples recited herein.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is an RFID object matching system and method. In accordance with the present invention, two or more paired objects each can be configured with an RFID tag. The respective RFID tags each can be programmed with data suitable to indicate that each of the associated objects to which the RFID tags have been affixed are related and thus "matched". Subsequently, an RFID interrogator/reader can scan the RFID tags of at least two of the paired objects to determine that the objects have been appropriately matched. If the interrogator/reader concludes that the RFID tags do not contain data suitable to indicate that the two paired objects match, it can be concluded that the two objects are not paired. Otherwise, it can be definitively determined that the objects indeed are paired where the respective RFID tags of each produce the matching data.

Importantly, it is to be understood that the term paired objects refers to any set of tangible objects which are logically paired with one another. A non-exclusive listing of examples can include a baggage claim check and a bag, an admissions pass and an assigned seat, a purchased product and a product purchaser, and a car key and a car. Thus, it will be recognized by the skilled artisan that the present invention has application in such circumstances as matching a bag of purchased products with an electronic receipt, consumer purchase card, frequent shoppers card, or the like. It will be further recognized by the skilled artisan that the present invention has application in such circumstances as matching an admissions ticket to a spectator event to a particular seat, or a section of a viewing stand.

Figure 1:
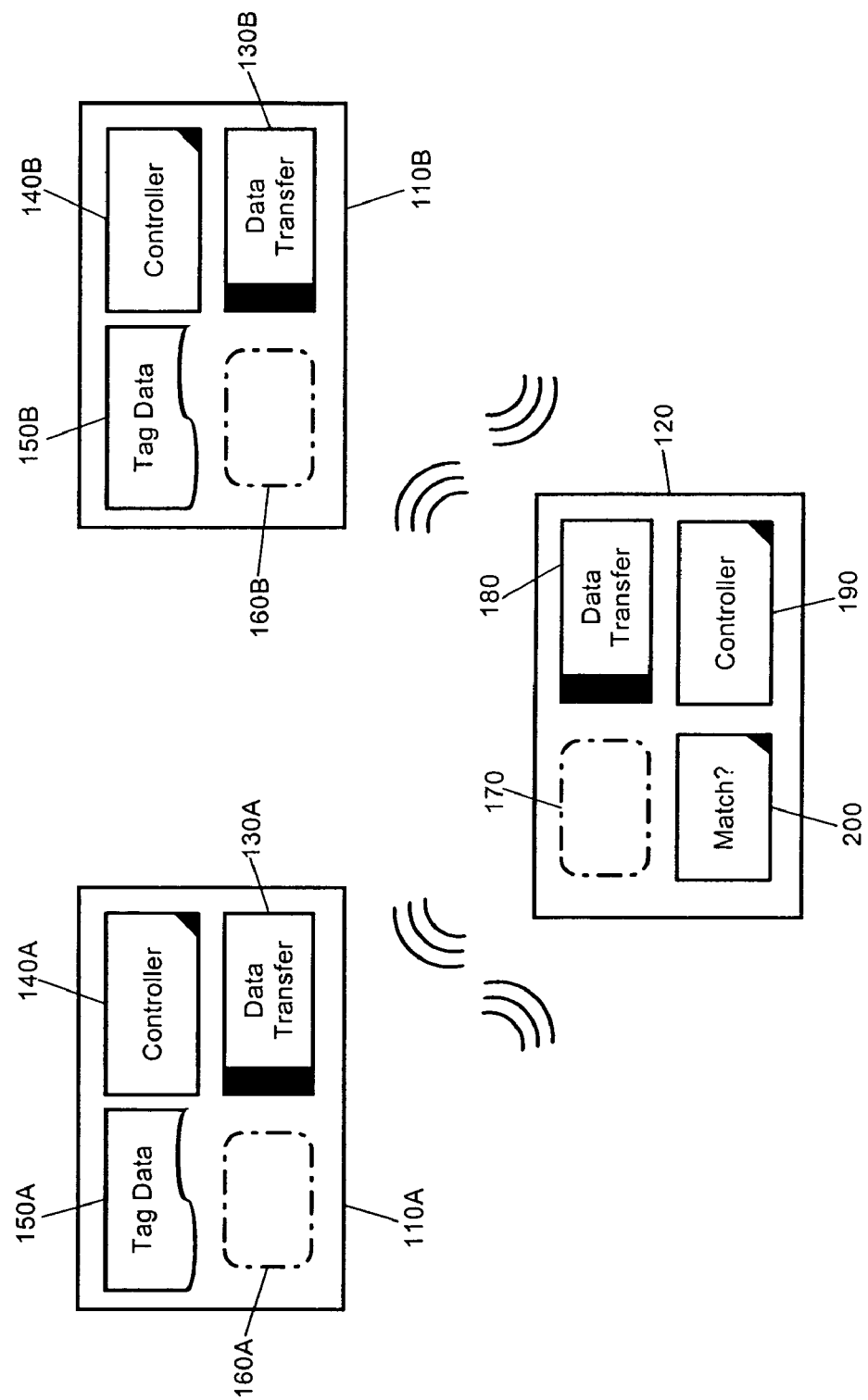
FIG. 1 is a schematic illustration of an RFID object matching system which has been configured in accordance with the present invention; and, FIG. 2 is a flow chart illustrating a process for managing object matching in the RFID object matching system of FIG. 1.

FIG. 1 is a schematic illustration of an RFID object matching system which has been configured in accordance with the present invention. In accordance with the present invention, two or more objects can be coupled to respective RFID tags 110A, 110B. Each RFID tag 110A, 110B can include tag data 150A, 150B, a controller 140A, 140B, data transfer logic 130A, 130B, and an antenna 160A, 160B. A reader 120 can be configured with an antenna 170, data transfer logic 180, and a controller 190. The RFID tags 110A, 110B can be configured to match through the programming of the RFID tags 110A, 110B with matching tag data 150A, 150B. When placed in proximity to the reader 120, the reader 120 can interrogate each one of the RFID tags 110 to retrieve the matching tag data 150A, 150B.

More specifically, in a passive implementation of the present invention, the controller 190 of the reader 120 can broadcast radio frequency energy through antenna 170 so that the antennae 160A, 160B in each of the tags 110A, 110B can become energized. Data transfer logic 130A, 130B can receive the broadcast radio frequency energy responsive to which the controller 140A, 140B can retrieve the tag data 150A, 150B. The controller 140A, 140B can encode and modulate the retrieved tag data 150A, 150B upon the broadcast radio frequency energy which can be rebroadcast using the antennae 160A, 160B. The rebroadcast energy can be received through antenna 170. Subsequently, data transfer logic 180 can demodulate and decode the tag data 150A, 150B. Subsequently, matching logic 200 can process the tag data 150A, 150B.

Figure 2:
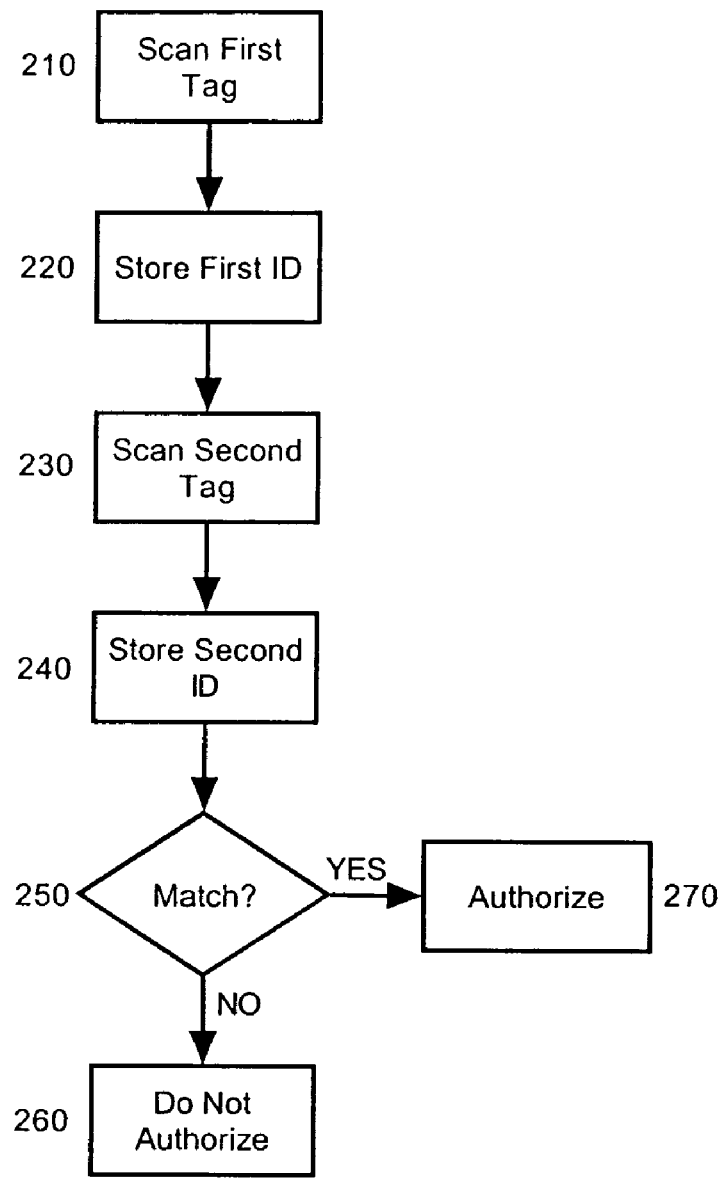

FIG. 2 is a flow chart illustrating a process for managing object matching in the matching logic 200 of FIG. 1. In particular, the process of FIG. 2 represents the simplistic case of matching two objects through respective RFID tags to determine whether the two objects had been paired. Beginning in block 210, the first tag can be scanned and in block 220 the identity of the tag can be stored. In block 230, the second tag can be scanned and in block 240 the identity of the tag can be stored. In decision block 250, it can be determined whether the identities match. If so, in block 270 a match can be concluded. Otherwise, in block 260, a non-match can be concluded.

As used herein the "match" refers to the pre-programmatic association of tag data to determine that objects coupled to the RFID tags had been pre-associated with one another as a pair. Thus, one skilled in the art will recognize that the tag data used to indicate a match can range from a simple identification string to a complex combination of data which when processed algorithmically can produce a match—even where the complex combination does not produce a mathematical identity. Additionally, it will be recognized by the skilled artisan that the invention is not limited to the matching of two objects. Rather, a multiplicity of objects can be accommodated as it will be apparent from the foregoing description of the preferred embodiments.

In further illustration, in the simple case of matching a bag to a baggage claim check, the exact claim number can be matched as between an RFID tag affixed to the bag, and an RFID tag affixed to a claim check. By comparison, in the complex case of matching a ticket stub to a stadium section rather than a particular seat, a section number stored in an RFID tag affixed to a stadium section can be matched to a mere portion of a seat number stored in an RFID tag affixed to the ticket, where the seat number reflects not only the seat, but also the row and the section. As yet another example, a consumer purchase card having an RFID tag storing a customer ID can be matched to customer purchase data stored in individual RFID tags coupled to a selection of purchased items in a shopping cart or bag. In this way, a security clerk can confirm that each item in the cart or bag had been purchased by the consumer holding the consumer purchase card without requiring the manual inspection of the same.

In further illustration, the RFID tag matching logic of the present invention can be applied in the retail setting to automate the distribution of purchased goods to a consumer without incurring the risk of theft which ordinarily necessitates the presence of a cashier or inventory clerk. As an example, a conveyor belt can be equipped with an RFID scanner able to scan RFID tags in proximity to the scanner, including RFID tags on passing goods and matching portable RFID tags held by consumers who have purchased goods from the store. When the matching good passes under the scanner, the scanner can indicate to the consumer that the proper good can be retrieved from the conveyor belt. In an more advanced implementation, a series of RFID scanners can be positioned along the conveyor belt so that multiple customers can be processed concurrently.

In yet a further illustration, the RFID tag matching logic can be deployed in the stadium or theater context so as to facilitate the location of a seat matching an admissions ticket. In particular, where the seating has been arranged in subdivisions of sections, rows, and possibly levels, each threshold leading into a subdivision can be equipped with an RFID scanner. As the ticket passes in proximity to the RFID scanner, a green light can indicate whether the spectator has selected the proper subdivision. As the spectator approaches the proper section, floor lighting can illuminate indicating an efficient path to the proper seat. To implement such a scheme all lights disposed between the proper seat and the threshold can be illuminated. In this regard, the scanner can match the RFID tag on the seat with the RFID tag in the admissions ticket.

The method of the present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. An object matching system comprising:
    a plurality of radio frequency identification (RFID) tags storing corresponding tag data coupled individually to respective objects, wherein selected ones of said RFID tags are programmed with tag data associating said selected ones of said RFID tags with one another;
    at least one RFID reader/interrogator configured to interrogate said RFID tags and responsive to said interrogation to read said corresponding tag data; and,
    matching logic programmed to determine whether interrogated ones of said RFID tags contain tag data indicating an association between coupled ones of said objects,
    wherein said objects comprise assigned seats in a seating area and respective admissions tickets associated with said assigned seats, wherein said RFID reader/interrogator is disposed in proximity to a threshold leading into said seating area.

2. The object matching system of claim 1, further comprising a pathway of lights disposed between at least one of said seats and said threshold wherein said pathway is configured to illuminate when a corresponding admissions ticket assigned to said at least one of said seats passes in proximity to said RFID reader/interrogator.

3. A method of matching objects, the method comprising the steps of:
    programming at least two radio frequency identification (RFID) tags with a baggage claim check number;
    for each baggage claim check number, coupling one of said programmed RFID tags to a bag and another of said programmed RFID tags to a claim check;
    interrogating at least two of said RFID tags coupled to respective bags;
    responsive to said interrogation, reading tag data from each of said at least two RFID tags; and,
    determining whether said tag data matches.

4. A method of matching objects, the method comprising the steps of:

programming at least two radio frequency identification (RFID) tags with a customer identifier;

coupling one of said programmed RFID tags to a consumer card held by a customer, and coupling remaining ones of said programmed RFID tags to products which have been purchased by said customer;

interrogating at least two of said RFID tags;

responsive to said interrogation, reading tag data from each of said at least two RFID tags; and, determining whether said tag data matches.

5. A method of matching objects, the method comprising the steps of:

programming at least two radio frequency identification (RFID) tags with a ticket number;

coupling one of said programmed RFID tags to a seat associated with a ticket having said ticket number, and coupling another of said programmed RFID tags to said ticket, interrogating at least two of said RFID tags;

responsive to said interrogation, reading tag data from each of said at least two RFID tags; and, determining whether said tag data matches.

6. A machine readable storage having stored thereon a computer program for matching objects, the computer program comprising a routine set of instructions for causing the machine to perform the steps of:

programming at least two radio frequency identification (RFID) tags with a customer identifier;

coupling one of said programmed RFID tags to a consumer card held by a customer, and coupling remaining ones of said programmed RFID tags to products which have been purchased by said customer;

interrogating at least two RFID tags coupled to a respective consumer card and product;

responsive to said interrogation, reading tag data from each of said at least two RFID tags; and, determining whether said tag data matches.

7. The machine readable storage of claim 6, wherein said determining step comprises the step of determining whether at least a portion of said tag data matches.

* * * * *